(12) United States Patent
Francke et al.

(10) Patent No.: US 6,389,103 B2
(45) Date of Patent: May 14, 2002

(54) METHOD AND AN APPARATUS FOR RADIOGRAPHY AND A RADIATION DETECTOR

(75) Inventors: Tom Francke; Christer Ullberg, both of Sollentuna; Juha Rantanen, Solna, all of (SE)

(73) Assignee: XCounter AB, Danderyd (SE)

( * ) Notice: Subject to any disclaimer, the term of this patent is extended or adjusted under 35 U.S.C. 154(b) by 0 days.

(21) Appl. No.: 09/730,740

(22) Filed: Dec. 7, 2000

(30) Foreign Application Priority Data

Dec. 29, 1999 (SE) .............................................. 9904834

(51) Int. Cl.[7] .......................... H05G 1/64; G01T 1/185; H01J 47/02
(52) U.S. Cl. ........................ 378/98; 250/374; 250/385.1
(58) Field of Search .............................. 250/374, 385.1; 378/98, 98.8

(56) References Cited

U.S. PATENT DOCUMENTS

| | | | | |
|---|---|---|---|---|
| 4,302,696 A | * | 11/1981 | Wakayama et al. | 313/93 |
| 5,521,956 A | * | 5/1996 | Charpak | 378/146 |
| 5,596,201 A | * | 1/1997 | Charpak | 250/385.1 |
| 5,604,783 A | * | 2/1997 | Charpak | 378/146 |
| 5,629,524 A | * | 5/1997 | Stettner et al. | 250/370.09 |
| 5,959,302 A | * | 9/1999 | Charpak | 250/385.1 |
| 6,118,125 A | * | 9/2000 | Carlson et al. | 250/385.1 |
| 6,133,575 A | * | 10/2000 | Charpak et al. | 250/385.1 |

* cited by examiner

*Primary Examiner*—Robert H. Kim
*Assistant Examiner*—Allen C. Ho (57) ABSTRACT

A method and apparatus for radiography and also a detector for detecting incident radiation. In the method and the apparatus X-rays (9) are emitted from an X-ray source (60). The X-rays which have interfered with an object to be imaged are detected (62) in a detector (64). The detector (64), which detects incident radiation includes a gaseous avalanche chamber, including electrode arrangements between which a voltage is applied for creating an electrical field, which causes electron-ion avalanches of primary and secondary ionization electrons released by incident radiation. The detector detects electrical signals in at least two detector electrode modules, the electrical signals being induced by electron-ion avalanches, in at least one of a plurality of detector electrode elements arranged adjacent to each other, each along a direction essentially parallel to the incident radiation, and where the at least two independent detector electrode modules are arranged along a direction essentially parallel to the incident radiation.

40 Claims, 4 Drawing Sheets

METHOD AND AN APPARATUS FOR RADIOGRAPHY AND A RADIATION DETECTOR

FIELD OF THE INVENTION

The present invention relates to a method and apparatus for radiography and to a gaseous avalanche detector.

BACKGROUND OF THE INVENTION

X-rays have been used in radiographic imaging for a long time, and have been subject to great developments. In its simplest form, imaging is conducted by providing a source of X-ray radiation, an object to be imaged, through which the radiation is transmitted, and a detector for the detection and recording of the transmitted radiation. X-rays may also be scattered by the object to be imaged and detected by the detector. The X-ray detector used today, at hospitals, is normally a screen-film combination. In a phosphor screen (e.g. $Gd_2O_2S$), X-ray photons are converted and thereby produce secondary light, which is registered on a photographic film. The use of a film limits the dynamic range of the image. The increased efficiency achieved by using a phosphor screen is provided at the expense of resolution, since the secondary light is emitted isotropically.

Digital X-ray detectors today are normally made of some type of semiconductor detector, e.g. CCD, TFT, etc. To cover the large image format necessary in most medical X-ray imaging the detectors have to be made large, which in most cases results in a high production cost and low yield. One way to solve this problem is to make the detector modular and tiled together to form a large image format.

However the use of such an assembly of semiconductor X-ray detectors introduces a further problem in that blind, non radiation-detecting areas are introduced at the borders of the individual detectors, since semiconductor detectors needs a so called guard ring around them to limit the leakage current.

A solution to this problem is disclosed in U.S. Pat. No. 5,381,014 wherein they fabricate a large area X-ray image capture element by juxtaposing a plurality of discrete array modules in an assembly over a base plate so that each module is adjacent to at least one other module to form a two-dimensional mosaic of the modules. Each module includes a plurality of thin film transistors (TFT) arrayed adjacent on the top surface of a dielectric substrate and at least one precision ground edge of the substrate forms a precise abutment with a one precision ground edge of another substrate. A continuous radiation detecting layer is then disposed over the plurality of juxtaposed modules to form the large format element which minimises non-radiation-detecting areas between modules.

A drawback with this prior art is that each module of the detector has to be in physical and electrical contact with each other in order to produce said large area X-ray image capture element which will result in a relatively high manufacturing and assembling cost.

Another drawback with this type of modular detector is that the data and address circuits from each module have to be connected to the corresponding circuits in the neighbouring modules which will also result in a relatively high assembling cost.

Yet another drawback with this type of modular detector is that a broken module cannot be replaced without having to remove and redeposit the radiation detecting layer, if at all possible.

SUMMARY OF THE INVENTION

It is an object of the present invention to provide an X-ray detector and a method and apparatus for radiography that at least reduces the above mentioned drawbacks.

According to an aspect of the present invention, there is provided a method for obtaining images in radiography, comprising emitting X-rays from an X-ray source, detecting the X-rays which have been interfered by an object to be imaged in a gaseous avalanche detector including electrode arrangements between which a voltage is applied for creating an electrical field, and detecting electrical signals in at least two detector electrode modules, said electrical signals being induced by electron-ion avalanches, in at least one of a plurality of detector electrode elements arranged adjacent to each other, each along a direction essentially parallel to the incident radiation, and where the at least two independent detector electrode modules are arranged, each along a direction essentially parallel to the incident radiation, and an apparatus for use in radiography, comprising an X-ray source, a gaseous avalanche detector, including electrode arrangements between which a voltage is applied for creating an electrical field, for detecting X-ray photons which have been interfered by an object to be imaged, at least two independent detector electrode modules including a plurality of detector electrode elements arranged adjacent to each other, each along a direction essentially parallel to the incident radiation, and where said at least two independent detector electrode modules are arranged along a direction essentially parallel to the incident radiation.

respectively and a gaseous avalanche detector for detecting incident radiation, including electrode arrangements between which a voltage is applied for creating an electrical field, wherein the gaseous avalanche detector comprises a gaseous avalanche chamber for detecting incident radiation, and at least two independent detector electrode modules including a plurality of detector electrode elements arranged adjacent to each other, each along a direction essentially parallel to the incident radiation, and where said at least two independent detector electrode modules are arranged along a direction essentially parallel to the incident radiation.

Further objects are attained by further features in the appended claims.

An advantage of having at least two detector electrode modules is that they provide independent modules and therefore are easy to exchange.

Another advantage of having independent modules is that they neither need to be in physical nor in electrical contact with each other which simplifies the ability to change said arrangements, and reduces the assembly cost.

Yet another advantage of having independent modules according to the present invention is that the mechanical tolerances of each module are less severe compared to modules in a semiconductor detector and hence the manufacturing cost is reduced.

Still another advantage of having at least two detector electrode modules is that the detector will be less expensive per area unit compared to single large detector area.

Still another advantage of having at least two detector electrode modules is that the yield of the assembled detector will be higher compared to a single large detector area.

Still another advantage is that the requirements of the materials of substrate on which the conducting electrodes are arranged is not critical since said substrate is only used as a carrier for said conducting elements and therefore the manufacturing cost is reduced and the production yield is increased.

Still another advantage with the inventive modular detector is that the detector electrode modules do not need to be deposited by a radiation detecting layer which simplifies manufacturing, assembly and replacement of said modules.

DESCRIPTION OF PREFERRED EMBODIMENTS

Figure 1:
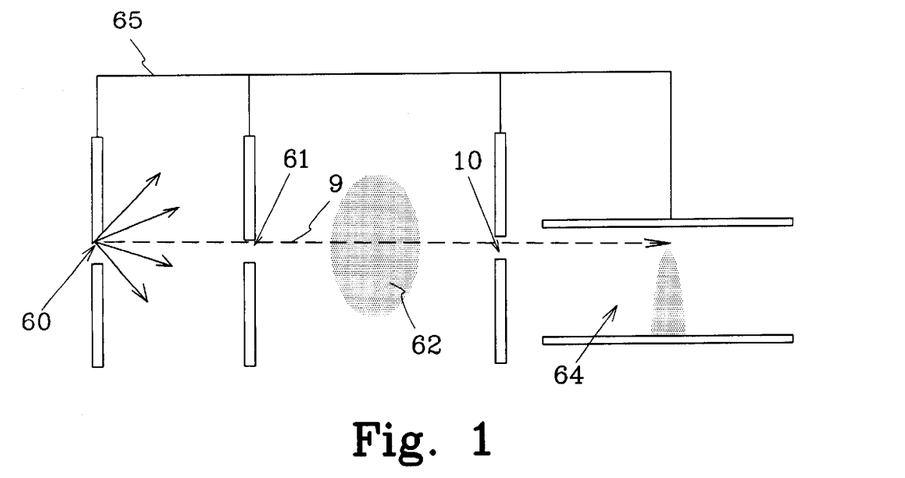
FIG. 1 illustrates schematically, in an overall view, an apparatus for planar beam radiography in which a detector comprising at least two detector electrode arrangements according to the invention is arranged.

FIG. 1 shows an apparatus for planar beam radiography and a gaseous avalanche chamber according to the state of the art, as set forth, for example, in Swedish patent application SE-9704015-8. The description corresponding to said figures is intended to give the reader a short introduction into the field of gaseous avalanche detectors.

FIG. 1 is a sectional view in a plane orthogonal to the plane of a planar X-ray beam 9 of an apparatus for planar beam radiography in which a detector comprising a plurality of detector electrode modules according to the invention is arranged.

The apparatus includes an X-ray source 60, which optionally together with a first thin collimator window 61 produce the planar fan-shaped X-ray beam 9, for irradiation of an object 62 to be imaged. The first optional thin collimator window 61 can, if desired, be replaced by any other structure for forming an essentially planar X-ray beam, such as an X-ray diffraction mirror or an X-ray lens etc.

One function of collimator window 61 is to reduce the dose to the object which is necessary in some cases, e.g. when imaging living humans.

The beam transmitted through the object 62 enters a detector 64 comprising at least two independent detector electrode modules, optionally through a thin slit or second collimator window 10, which is aligned with the X-ray beam. A major fraction of the incident X-ray photons are detected in the detector 64, which include a gaseous avalanche chamber, oriented so that the X-ray photons enter sideways between the cathode plate 2 and the anode plate 1.

The detector 64 and its operation will be further described below. The X-ray source 60, the first optional thin collimator window 61, the optional collimator window 10 and the gaseous avalanche chamber 64 can move or be moved in relation to each other by, for example, a frame or support 65 or independent, but commonly controlled, motors. The so formed apparatus for radiography can be moved synchronously to scan an object which is to be examined.

A gaseous avalanche chamber is generally composed of a gas-filled volume subjected to a strong electric field, which is generated by applying a high voltage between electrodes, comprised in each of two plates constituting two limiting walls of the chamber. In operation, X-rays 9 are incident on the detector substantially sideways. The incident X-rays 9 enter the detector through an optional thin slit or collimator window 10 near the detector 64, and travel through the gas volume in a direction essentially parallel to the cathode plate 2. Each X-ray photon incident into the gas-filled volume produces a primary ionisation electron-ion pair within the gas as a result of interaction with a gas molecule. This production is caused by photo-effect or Compton-effect, and possibly accompanied with an electron from Auger-effect. Each primary electron 11 produced loses its kinetic energy through interactions with new gas molecules causing further production of electron-ion pairs (secondary ionisation electron-ion pairs). Typically a few hundred secondary ionisation electron-ion pairs are produced from a 20 keV X-ray photon in this process. The secondary ionisation electrons 16 (together with the primary ionisation electron 11) are then amplified by electron-ion avalanches in the strong electric field. The movements of the avalanche electrons and ions induce electrical signals in the electrodes 4. The signals are typically picked up in one or both of the electrodes 4, and are further amplified and processed by a readout circuitry to obtain an accurate measurement of the X-ray photon interaction point and, optionally the X-ray photon energy.

In a preferred embodiment of the invention, the X-rays to be detected are incident substantially sideways on the detector 64 in a direction essentially parallel to the cathode 2 and anode 1 plates, and may enter the detector 64 through the thin slit or collimator window 10. In this way the detector 64 can easily be made with an interaction path long enough to allow a major fraction of the incident X-ray photons to interact and be detected.

Figure 2:
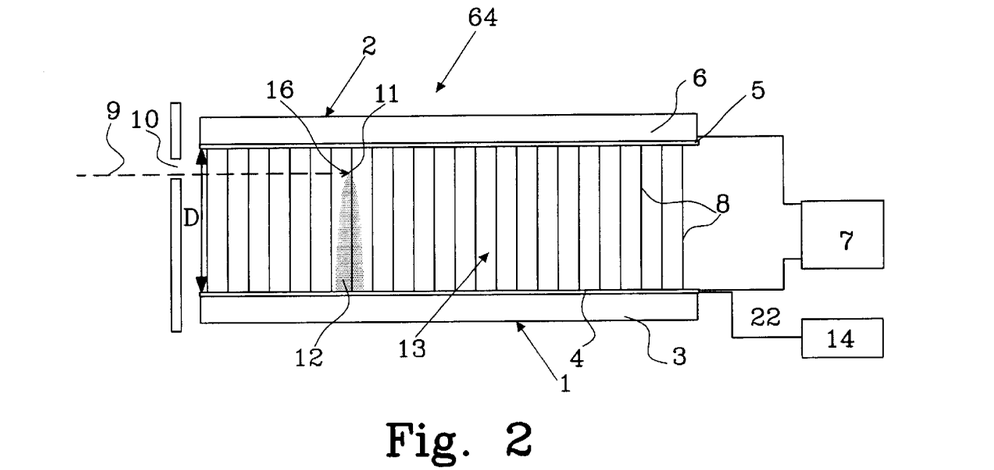
FIG. 2 is a schematic cross sectional view of a first embodiment of a gaseous parallel plate avalanche chamber comprising at least two detector electrode modules according to the invention.

Referring to FIG. 2, an embodiment of a detector, comprising the inventive plurality of detector electrode modules, is shown, and designated the reference number 64. This gaseous parallel plate avalanche chamber includes an anode plate 1 and a cathode plate 2, being essentially mutually parallel and separated by a thin gas-filled gap or region 13. The anode plate 1 includes a substrate 3, made of for example glass, ceramics or silicon having a thickness of preferably 0.1–10 mm, and an anode electrode 4 arranged thereon in the form of a coating of a conductive material, for example metal, having a thickness of preferably 0.01–10 $\mu$m.

For better adhesion to the substrate and for better layer stability, the electrode 4 may include several metal layers, each with a different thickness and material, for example vanadium, copper and nickel. When the substrate 3 is made of glass, the first layer is preferably of chromium, which has good adhesion properties to glass as well as to the following metal layers. The electrode 4 may also include a layer of resistive material, for example silicon monoxide, deposited on top of the metal layer(s). The substrate may alternatively be made of an electrically conductive material coated with a dielectric material. In a preferred embodiment, the electrode 4 is arranged on top of said dielectric material.

Likewise, the cathode plate 2 includes a substrate 6 with a coating 5, similar to what is described about the anode plate 1. Both the anode electrode 4 and the cathode electrode 5 can be segmented into strips parallel and/or orthogonal to the incoming X-ray beam.

The gap or region 13 is filled with a gas, which can be a mixture of for example 90% krypton and 10% carbon dioxide or a mixture of for example 90% argon and 10% methane. The gas can be under pressure, preferably in a range 1–20 atm.

The anode electrode 4 and the cathode electrode 5 are connected to a high voltage DC power supply 7, for producing a uniform electric field 8, in the gap or region 13 between the parallel plates 1 and 2. As an example, the gap or region 13 has a height D (distance between the parallel plates 1 and 2) of 500 microns, and the voltage V applied between the electrodes 4 and 5 is 1500 V for an argon/$CO_2$ (80/20) mixture at 1 atm. The voltage applied creates an electric field E between the electrodes 4 and 5, that is equal E=V/D. The distance D and the voltage V are chosen so as to provide an electric field of the order of $10^6$ V/m. Thus, a distance D of 500 $\mu$m and a voltage V of 1500 V gives an electric field E=3·$10^6$ V/m. The distance D may be in the range of 10–5000 $\mu$m, and the voltage may be in the range of 10–15000 V.

In operation, X-rays 9 are incident on the detector 64 substantially sideways. The incident X-rays 9 enter the detector 64 through an optional thin slit or collimator window 10 close to the cathode plate 2, and travel through the gas volume in a direction substantially parallel to the cathode plate 2. Each X-ray photon produces a primary ionization electron-ion pair within the gas as a result of interaction with a gas atom. Each primary electron 11 produced loses its kinetic energy through interactions with gas molecules causing further production of electron-ion pairs (secondary ionization electron-ion pairs). Typically a few hundred secondary ionization electron-ion pairs are produced from a 20 keV X-ray photon in this process. The secondary ionization electrons 16 (together with the primary ionization electron 11) are accelerated in the high electric field, in a direction towards the anode plate 1. The accelerated electrons 11, 16 interact with other gas molecules in the gap 13 causing further electron-ion pairs to be produced. Those produced electrons will also be accelerated in the field, and will interact with new gas molecules, causing further electron-ion pairs to be produced. This process continues during the travel of the electrons towards the anode and an avalanche 12 will be formed.

For primary ionisation electrons emitted at a distance H from the anode, the overall charge gain is given by M=exp ($\alpha$H), where $\alpha$ is the first Townsend coefficient pertinent to the gas and field conditions. Under proper choices of gas type, pressure and electrical field, gains from $10^4$ to $10^6$ and more can be achieved. Under the influence of the strong electric field, the electrons in the avalanche volume will move towards the anode electrode 4, while the ions will move towards the cathode electrode 5. Due to the fact that the strong electric field is uniform over the gap and the height D of the gap 13 is small, a very short drift time of the positive ions across the amplification volume is achieved, which drastically reduces space charge effects.

The movement of charges in the gas filled gap 13 induces electrical charges on the anode electrode 4 as well as on the cathode electrode 5. The induced charges can be detected, for example, by coupling the anode electrode 4 to a charge sensitive amplifier, which converts the charge pulses into a current or voltage pulse that can be further processed in processing electronics 14, (which may also include a preamplifier). The cathode electrode 5 or a separate detector electrode arrangement can be used for the detection in a similar way. The fast electron signal in a gaseous parallel plate avalanche chamber constitutes a considerable fraction, F, of the total induced charge, and is about 10% of the total signals at gains around $10^5$.

It is to be noted that many incident X-ray photons that interact with a gas atom will cause an avalanche 12, which is to be detected. In order to achieve a high detection efficiency where a major fraction of the X-ray photons causes avalanches, the length of the gaseous parallel plate avalanche chamber, in the direction of the incident X-ray photons, should be chosen to give a high probability for interaction between the X-ray photons and the gas atoms. The probability of interaction per unit path length increases with increasing gas pressure, resulting in that the length of the gaseous parallel plate avalanche chamber can be made shorter with increasing gas pressure.

Figure 3A:
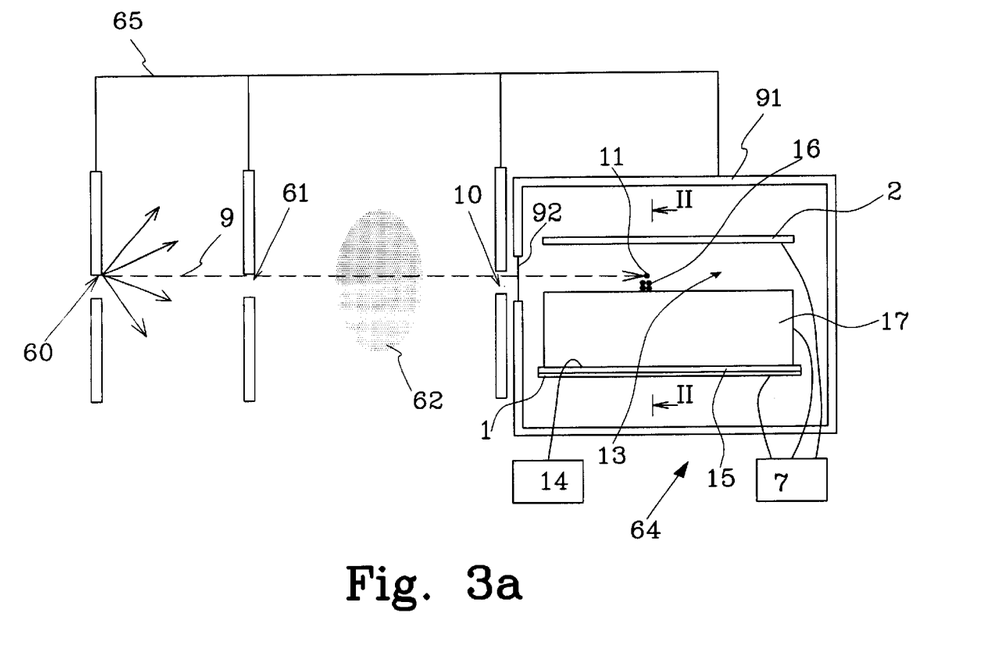
FIG. 3a illustrates schematically, in an overall view, an apparatus for planar beam radiography comprising at least two detector electrode arrangements according to the invention.

FIG. 3a shows a sectional view in a plane orthogonal to the plane of a planar X-ray beam 9 of a detector for planar beam radiography. An optional thin slit or second collimator window 10, which is aligned with the X-ray beam, forms the entrance for the X-ray beam 9 to the detector 64. A major fraction of the incident X-ray photons are detected in the detector 64, which includes a conversion and drift volume 13, and an electron avalanche amplification unit 17, and is oriented so that the X-ray photons enter substantially sideways between two electrode arrangements 1, 2, between which an electric field for drift of electrons and ions in the conversion and drift volume 13 is created.

Figure 3B:
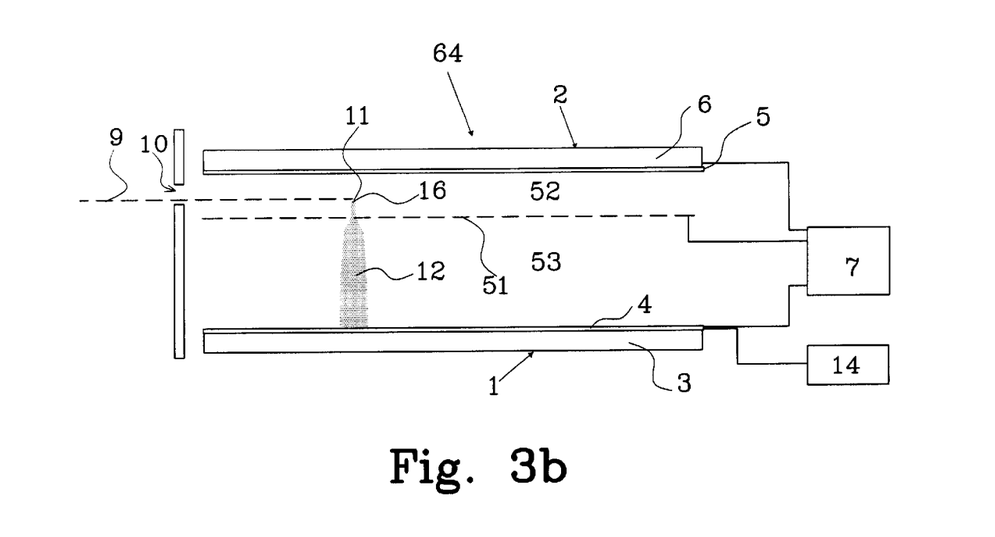
FIG. 3b is a schematic cross sectional view of a second embodiment of a gaseous parallel plate avalanche chamber comprising at least two detector electrode modules according to the invention.

The detector 64 includes a first drift electrode arrangement being a cathode plate 2 and a second drift electrode arrangement being an anode plate 1. They are substantially parallel to each other and the space in between includes a thin gas-filled gap or region 13, being the conversion and drift volume, and an electron avalanche amplification unit 17. Alternatively the plates can be non-parallel. A voltage is applied between the anode plate 1 and the cathode plate 2, and one or several voltages is (are) applied on the electron avalanche amplification unit 17. This results in a drift field causing drift of electrons and ions in the gap 13, and electron avalanche amplification fields in the electron avalanche amplification unit 17. In connection with the anode plate 1 is an arrangement 15 of read-out elements for detection of electron avalanches provided. Preferably the arrangement of read-out elements 15 also constitutes the anode electrode 4. Alternatively the arrangement of read-out elements 15 can be formed in connection with the cathode plate 2 or the electron avalanche amplification unit 17. It can also be formed on the anode 1 or cathode 2 plate separated from the anode 4 or cathode 5 electrode by a dielectric layer or substrate. In this case it is necessary that the anode or cathode electrode is semi-transparent to induced pulses, i.e. formed as strips or pads. The separation between the drift volume and the amplification volume e.g. can be made in the form of a thin mesh 51 with conducting surfaces, as shown in FIG. 3b. Electric potentials are supplied on the surfaces of the mesh 51 to cause a weak electric field in the drift volume between the cathode and the mesh which allows the produced primary and secondary ionisation electrons 11, 16 to drift towards the mesh 51 without being amplified or moderately amplified in electron-ion avalanche processes in the gas. The potentials on the surfaces of the mesh 51 are supplied such that the electric field in the amplification region between the mesh 51 and the anode 1 is strong enough to cause electron-ion avalanche processes in the gas. The induced signals from the moving electrons and ions are detected in the electrode arrangement on the anode 1 and/or mesh 51.

As seen, the X-rays to be detected are incident substantially sideways on the detector 64 and enters the conversion and drift volume 13 between the cathode plate 2 and the anode plate 1. The X-rays enter the detector 64 preferably in a direction substantially parallel to the cathode plate 2 and the anode plate 1, and may enter the detector through a thin slit or collimator window 10. In this way the detector 64 can easily be made with an interaction path long enough to allow a major fraction of the incident X-ray photons to interact and be detected. In the case a collimator is used, this should preferably be arranged so that the thin planar beam enters the detector 64 close to the electron avalanche amplification unit 17 and preferably substantially parallel therewith.

The gap or region 13 is filled with a gas, which can be a mixture of for example 90% krypton and 10% carbon dioxide or a mixture of for example 80% xenon and 10% carbon dioxide. The gas can be under pressure, preferably in a range 1–20 atm. Therefore, the detector 64 may include a gas tight housing 91 with a slit entrance window 92, through which the X-ray beam 9 enters the detector 64. The window 92 is made of a material, which is transparent to the radiation, e.g. Mylar®, or a thin aluminum foil. This is a particularly advantageous additional effect of the invention, detecting substantially sideways incident beams in a gaseous avalanche chamber 64, compared to previously used gaseous avalanche chambers, which were designed for radiation incident perpendicular to the anode 1 and cathode 2 plates, requiring a window covering a large area. The window 92 can in this way be made thinner, thus reducing the number of X-ray photons absorbed in the window 92.

In operation, the incident X-rays 9 enter the detector 64 through the optional thin slit or collimator window 10, if present, close to the electron avalanche amplification unit 17, and travel through the gas volume in a direction preferably substantially parallel with the electron avalanche amplification unit 17. Each X-ray photon produces a primary ionisation electron-ion pair within the gas as a result of interaction with a gas atom. This production is caused by photo-effect, Compton-effect or Auger-effect. Each primary electron 11 produced loses its kinetic energy through interactions with new gas atoms, causing further production of electron-ion pairs (secondary ionisation electron-ion pairs). Typically a few hundred secondary ionisation electron-ion pairs are produced from a 20 keV X-ray photon in this process. The secondary ionisation electrons 16 (together with the primary ionisation electron 11) will drift towards the electron avalanche amplification unit 17 due to the electric field in the conversion and drift volume 13. When the electrons enter regions of focused field lines of the electron avalanche amplification unit 17, they undergo avalanche amplification.

The movements of the avalanche electrons and ions induce electrical signals in the arrangement 15 of read-out elements for detection of electron avalanches. Those signals are picked up in connection with the electron avalanche amplification unit 17, the cathode plate 2 or the anode plate 1, or a combination of two or more of said locations. The signals are further amplified and processed by readout circuitry 14 to obtain accurate measurements of the X-ray photon interaction points, and optionally the X-ray photon energies.

Figure 4A:
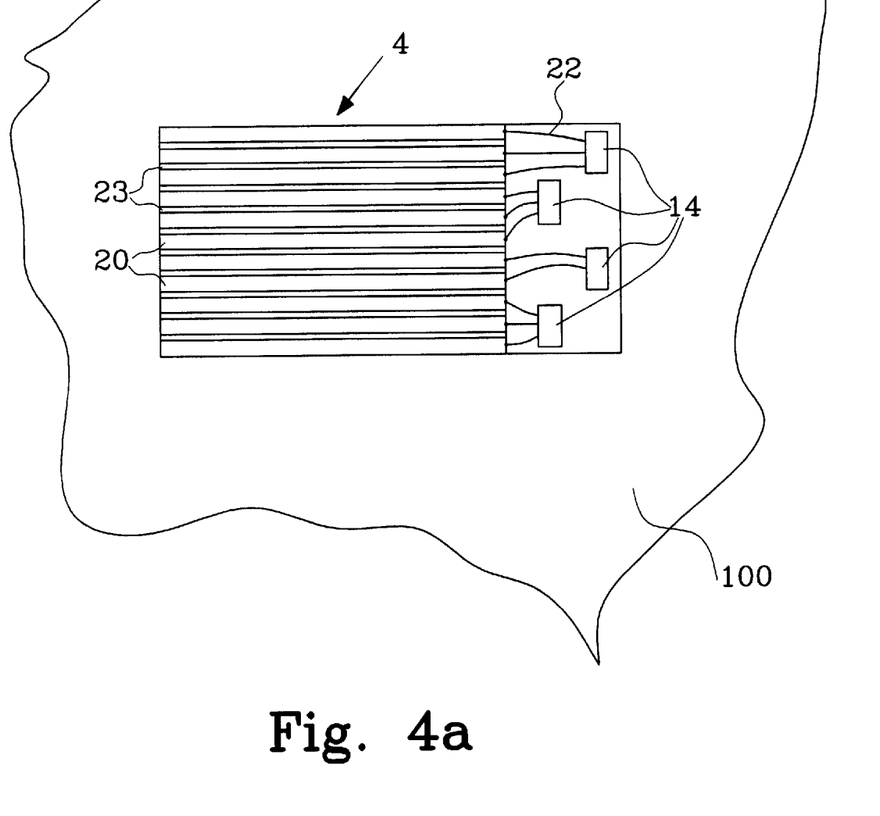
FIG. 4a is a schematic top view of one detector electrode module including processing electronics arranged on a substrate before separation of said arrangements.

Referring to FIG. 4a, one detector electrode module 4 is shown. The detector electrode module 4 comprising detector electrode elements formed as strips 20, acting as anode or cathode electrodes. A number of detector electrode elements in the form of strips 20 are placed side by side, and extend in directions substantially parallel to the direction of an incident X-ray photon at each location. The strips 20 are formed on a substrate 100, electrically insulated from each other, by leaving a space 23 between them. The strips may be formed by photo-lithographic methods or electroforming, etc.

Each strip 20 is connected to the processing electronics 14 by means of a separate signal conductor 22. Where the anode or cathode electrode constitute the detector electrode module, the signal conductors 22 also connects the respective strip to the high voltage DC power supply 7 (not shown in FIG. 4a).

The strips 20 and the spacing 23 may grow broader along the direction of incoming X-ray photons, thereby providing compensation for parallax errors. The strips can alternatively be divided perpendicular to the incident X-rays, into sections electrically insulated from each other.

The detector electrode module shown in FIG. 4a is preferably the anode 4, but alternatively or jointly the cathode 5 can have the described construction.

The substrate 100 can be made of metal on top of which a layer of electrically isolating material is arranged. On said electrically isolating material said detector electrode elements are arranged.

Alternatively the substrate 100 can be made of an electrically isolating material, such as glass or ceramics. Said detector electrode elements then can be arranged directly on top of said substrate.

A further alternative is that the substrate 100 is made of a semi-conducting material, such as silicon. Said detector electrode elements can either be arranged directly on top of said semi-conducting material or on top of an intermediate layer of a dielectric material, for example an oxide of said semi-conducting material.

Substrate 100 of e.g. silicon can be cut in arbitrary shapes to form independent detector electrode modules of arbitrary shapes, which are flat and smooth close to atomic level by using standard etching or cutting techniques. Especially dry etching is a powerful tool to shape the detector electrode modules since the etching technique chosen, in combination of the crystal direction, can give the electrodes nearly arbitrary shape in three dimensions.

Figure 4B:
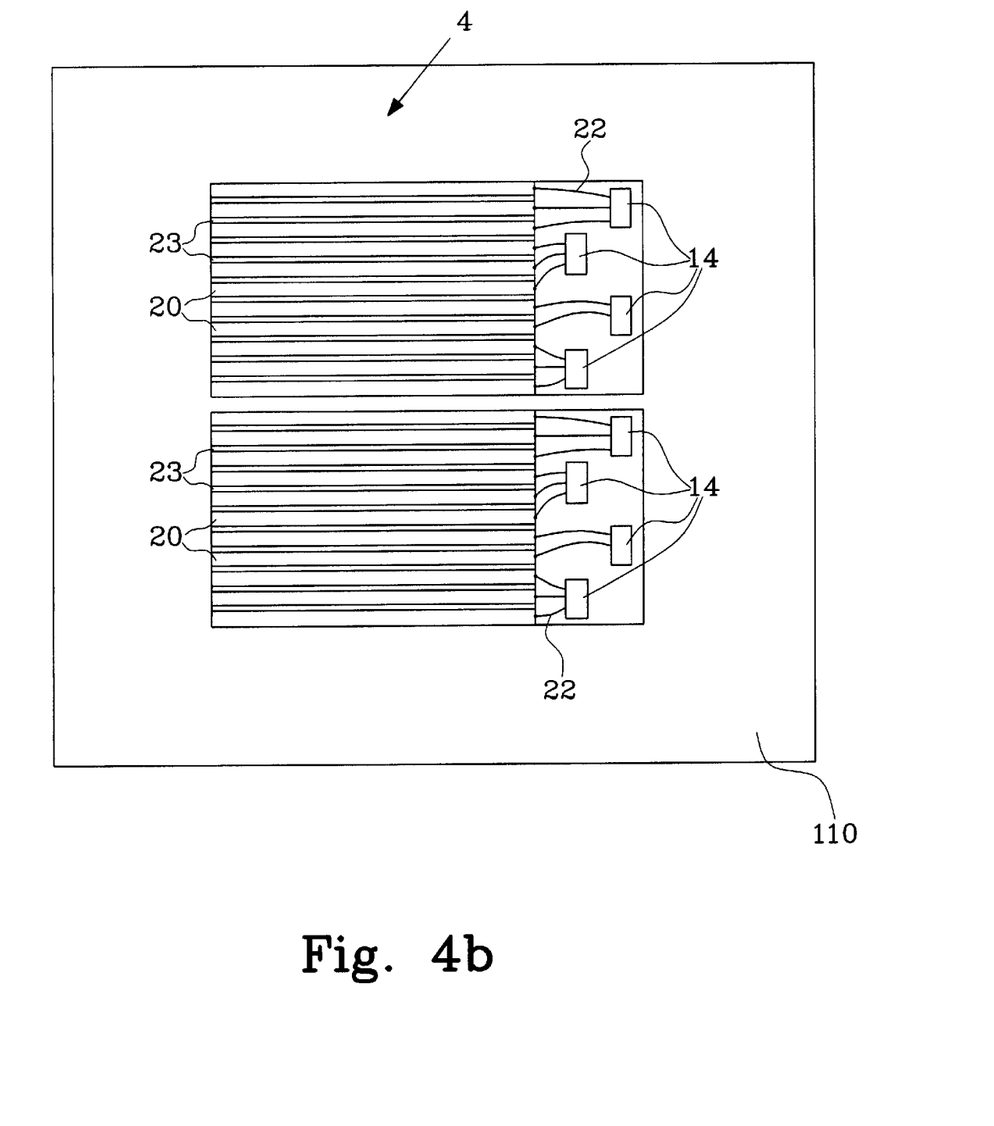
FIG. 4b is a schematic top view of two independent detector electrode modules including processing electronics arranged adjacent to each other on a carrying element.

In FIG. 4b each independent detector electrode module including said processing electronics are arranged in close proximity (for example, 0.0001–1 mm apart) to each other on top of a carrying element 110. Said carrying element 110 may be made of any material. Each detector electrode module can either be in physical contact with the adjacent detector electrode module or separated by a small distance. Said distance between two detector electrode modules may not be bigger than the electrode pitch in order to not introduce any blind non radiation-detection areas at the borders of the individual detector electrode arrangements.

In FIG. 4a and 4b the processing electronics are arranged on the same substrate as the detector electrode modules. However, said processing electronics may be arranged on a separate substrate. In FIG. 4b only two detector electrode arrangements are arranged adjacent to each other. However, three or more detector electrode modules may be arranged adjacent to each other, each along a direction being essentially perpendicular to the incident radiation. The detector electrode modules may also be arranged adjacent to each other, each along a direction being substantially parallel to the incident radiation.

Although the invention has been described in conjunction with a number of preferred embodiments, it is to be understood that various modifications may still be made without departing from the spirit and scope of the invention, as defined by the appended claims.

What is claimed is:

1. A method for obtaining images in radiography, comprising:

emitting X-rays from an X-ray source, detecting the X-rays which have been interfered by an object to be imaged in a gaseous avalanche detector including electrode arrangements between which a voltage is applied for creating an electrical field, and detecting electrical signals in at least two independent detector electrode modules, said electrical signals being induced by electron-ion avalanches, in at least one of a plurality of detector electrode elements arranged adjacent to each other, each along a direction essentially parallel to the incident radiation, and where the at least two independent detector electrode modules are arranged along a direction essentially parallel to the incident radiation.

2. The method according to claim 1, wherein the at least two independent detector electrode modules are arranged in close proximity to each other.

3. The method according to claim 2, wherein the at least two independent detector electrode modules are arrange 0.0001–1 mm apart.

4. The method according to claim 1, wherein the X-rays are transmitted through the object to be imaged.

5. The method according to claim 1, wherein the X-rays are reflected by the object to be imaged.

6. The method according to claim 1 further comprising:

orienting the gaseous avalanche chamber so that the radiation to be detected enters essentially sideways between a first and a second plate.

7. The method according to claim 6 further comprising:

applying the voltage between a first and a second electrode arrangement, included in the first and the second plate, respectively, for creating the electrical field between said first and second plate, which causes electron-ion avalanches of primary and secondary ionisation electrons released by incident X-ray photons.

8. The method according to claim 1, wherein the X-rays are detected in the direction of the incident radiation, where a depth of the gaseous avalanche detector permits interaction of a major fraction of the incident X-ray photons with gas atoms, for the production of primary ionisation electron-ion pairs, within the detector.

9. An apparatus for use in radiography, comprising an X-ray source, a gaseous avalanche detector, including electrode arrangements between which a voltage is applied for creating an electrical field, for detecting X-ray photons which have been interfered by an object to be imaged, at least two independent detector electrode modules including a plurality of detector electrode elements arranged adjacent to each other, each along a direction essentially parallel to the incident radiation, and where said at least two independent detector electrode modules are arranged along a direction essentially parallel to the incident radiation.

10. The apparatus for use in radiography according to claim 9, wherein the at least two independent detector electrode modules are arranged in close proximity to each other.

11. The apparatus for use in radiography according to claim 10, wherein the at least two independent detector electrode modules are arrange 0.0001–1 mm apart.

12. The apparatus for use in radiography according to claim 9, wherein the X-rays are transmitted through the object to be imaged.

13. The apparatus for use in radiography according to claim 9, wherein the X-rays are reflected by the object to be imaged.

14. The apparatus for use in radiography according to claim 9, further comprising an element for forming an essentially planar X-ray beam positioned between said X-ray source and the object to be imaged.

15. The apparatus for use in radiography according to claim 9, wherein the gaseous avalanche detector includes a gaseous plate avalanche chamber for detecting incident X-ray radiation, the gaseous plate avalanche chamber is oriented, in relation to the X-ray source, so that the X-rays are incident essentially sideways between a first and a second plate, between which the electrical field is to be created, by a voltage applied between a first and a second electrode arrangement included in the first and the second plate respectively, and the gaseous plate avalanche chamber has a depth, along the direction of the incident radiation, which permits interaction of a major fraction of the incident X-ray photons with gas atoms, for the production of primary ionisation electron-ion pairs, within the detector.

16. The apparatus for use in radiography according to claim 15, wherein the plates in the gaseous avalanche chamber are parallel.

17. The apparatus for use in radiography according to claim 15, wherein wherein the plates in the gaseous avalanche chamber are non-parallel.

18. The apparatus for use in radiography according to claim 9, wherein the detector electrode elements in at least one of said detector electrode modules are elongated, formed by strips arranged side by side and electrically insulated from each other.

19. The apparatus for use in radiography according to claim 9, wherein a first substrate of each of said detector electrode modules is arranged on a carrying element.

20. The apparatus for use in radiography according to claim 19, wherein the first substrate is made of a metallic material covered by a dielectric or a semi-conducting material.

21. The apparatus for use in radiography according to claim 19, wherein processing electronics is arranged on the first substrate.

22. The apparatus for use in radiography according to claim 21, wherein processing electronics is arranged on a second substrate on which the detector electrode elements are arranged.

23. The apparatus for use in radiography according to claim 9, wherein the detector electrode modules are arranged in electrical and/or physical contact with each other.

24. The apparatus for use in radiography according to claim 19, wherein the carrying element is the substrate of an anode or the substrate of a cathode.

25. The apparatus for use in radiography according to claim 18, wherein the strips are divided, essentially perpendicular to the incident X-rays, into sections electrically insulated from each other.

26. A gaseous avalanche detector for detecting incident radiation, including electrode arrangements between which a voltage is applied for creating an electrical field, wherein the gaseous avalanche detector comprises: a gaseous avalanche chamber for detecting incident radiation, and at least two independent detector electrode modules including a plurality of detector electrode elements arranged adjacent to each other, each along a direction being essentially parallel to the incident radiation, and where said at least two independent detector electrode modules are arranged along a direction essentially parallel to the incident radiation.

27. The gaseous avalanche detector according to claim 26, wherein the at least two independent detector electrode modules are arranged in close proximity to each other.

28. The gaseous avalanche detector according to claim 26, wherein the at least two independent detector electrode modules are arrange 0.0001–1 mm apart.

29. The gaseous avalanche detector according to claim 26, wherein the gaseous avalanche chamber is provided with an entrance for radiation to be incident essentially sideways between a first and a second plate, between which the electrical field is to be created, by means of a voltage applied between a first and a second electrode arrangement included in the first and the second plate respectively.

30. The gaseous avalanche detector according to claim 26, whereas the gaseous avalanche chamber has a depth, along the direction of the incident radiation, to permit interaction of a major fraction of the incident X-ray photons with gas atoms, for the production of primary ionisation electron-ion pairs, within the detector.

31. The gaseous avalanche detector according to claim 29, wherein the plates in the gaseous avalanche chamber are parallel.

32. The gaseous avalanche detector according to claim 29, wherein the plates in the gaseous avalanche chamber are non-parallel.

33. The gaseous avalanche detector according to claim 26, wherein the detector electrode elements in at least one of said detector electrode modules are elongated, formed by strips arranged side by side and electrically insulated from each other.

34. The gaseous avalanche detector according to claim 26, wherein a first substrate of each of said detector electrode modules is arranged on a carrying element.

35. The gaseous avalanche detector according to claim 34, wherein the substrate is made of a metallic material covered by a dielectric or a semi-conducting material.

36. The gaseous avalanche detector according to claim 34, wherein processing electronics is arranged on the first substrate.

37. The gaseous avalanche detector according to claim 34, wherein processing electronics is arranged on a second substrate separate from the first substrate on which the detector electrode elements are arranged.

38. The gaseous avalanche detector according to claim 26, wherein the detector electrode modules are arranged in electrical and/or physical contact with each other.

39. The gaseous avalanche detector according to claim 34, wherein the carrying element is the substrate of a anode or the substrate of a cathode.

40. The gaseous avalanche detector according to claim 33, wherein the strips are divided, essentially perpendicular to the incident X-rays, into sections electrically insulated from each other.

* * * * *